United States Patent [19]

Mukai et al.

[11] 4,116,656

[45] Sep. 26, 1978

[54] METHOD OF MANUFACTURING FIBERS OF INORGANIC MATERIAL AND APPARATUS FOR SAME

[75] Inventors: Kunihiko Mukai, c/o Mukai Consulting Engineers, Office, No. 349-45, Isshinden-cho, Tsu City, Japan; Michiharu Mishima, Matsusaka, Japan; Kiyoshi Ogino, Matsusaka, Japan; Shuichi Iseki, Matsusaka, Japan

[73] Assignees: Central Glass Company, Limited, Ube; Kunihiko Mukai, Tsu, both of Japan

[21] Appl. No.: 806,334

[22] Filed: Jun. 14, 1977

[30] Foreign Application Priority Data

Jun. 21, 1976 [JP] Japan ................................. 51-72896

[51] Int. Cl.$^2$ ........................................... C03B 37/04
[52] U.S. Cl. ............................................. 65/5; 65/16;
264/12; 425/7
[58] Field of Search ................... 65/5, 16; 264/12; 425/7

[56] References Cited

U.S. PATENT DOCUMENTS

| 2,814,832 | 12/1957 | Stephens | 65/5 |
| 3,224,852 | 12/1965 | Stalego | 65/16 |
| 3,891,730 | 6/1975 | Wessel et al. | 264/12 X |

FOREIGN PATENT DOCUMENTS 707,934  7/1941  Fed. Rep. of Germany.

*Primary Examiner*—Robert L. Lindsay, Jr.
*Attorney, Agent, or Firm*—Fleit & Jacobson

[57] ABSTRACT

Using a vessel which has a circular discharge port at the bottom and is provided with a nozzle in a coaxial arrangement with the port for ejecting a pressurized gas vertically downwards, a molten inorganic material such as a glass composition is allowed to vertically fall by gravitation as a hollow cylindrical stream. The fiberization of the molten material is accomplished by downwardly injecting a pressurized gas into the hollow of the cylindrical stream and, at the same time, blowing the pressurized gas at the cylindrical stream from a ring nozzle which is placed below the vessel and has downwardly and inwardly inclined orifices in a circumferential arrangement to surround the cylindrical stream.

19 Claims, 15 Drawing Figures

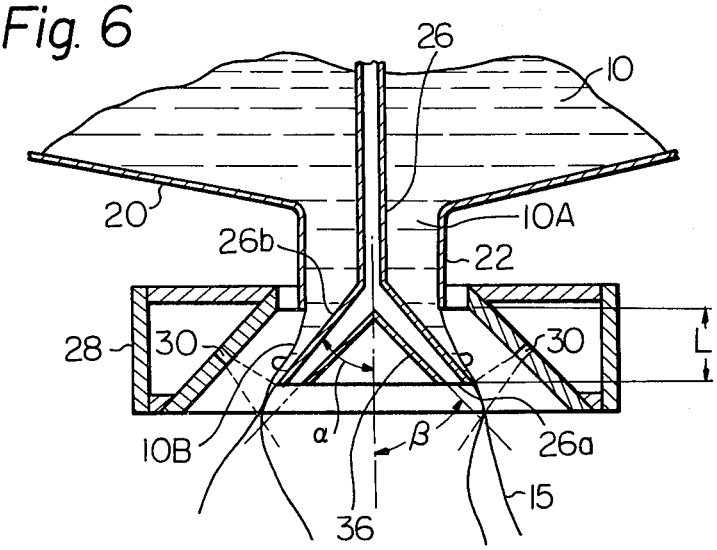
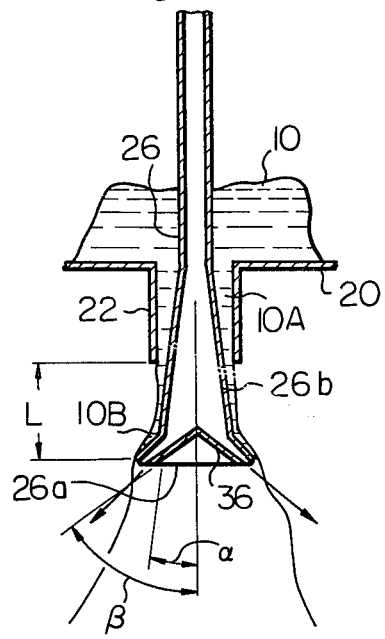
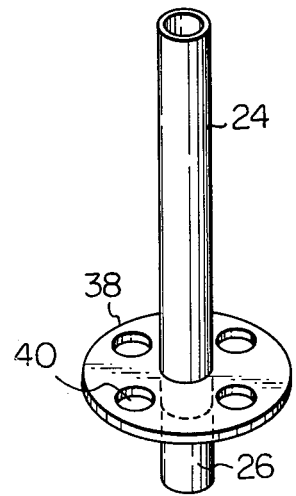

Fig. 9
Fig. 10
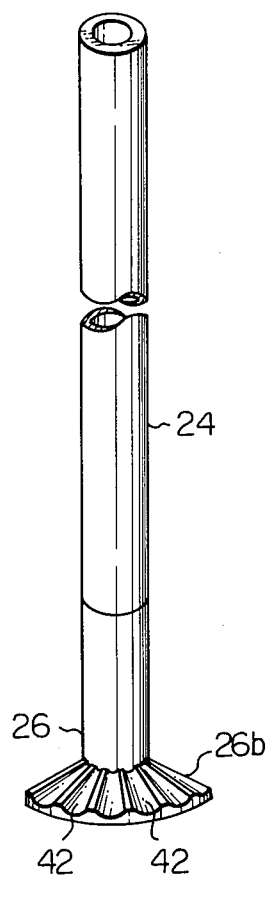
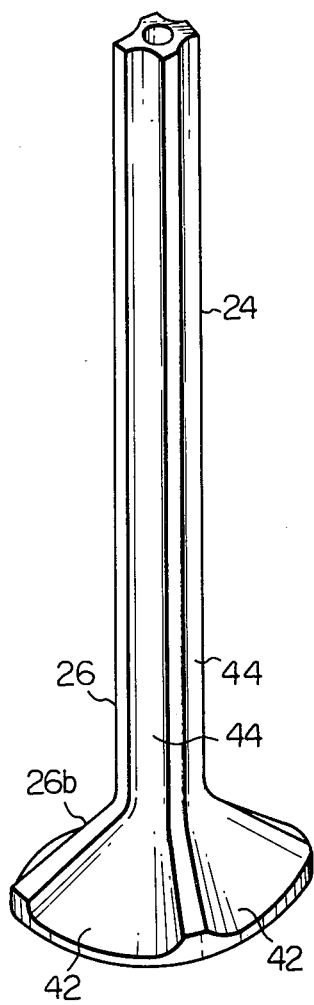

METHOD OF MANUFACTURING FIBERS OF INORGANIC MATERIAL AND APPARATUS FOR SAME

This invention relates to a method and apparatus for the manufacture of discontinuous fibres of inorganic materials which are fiberizable from a molten state as typified by glass compositions.

Some inorganic materials can be formed into fibres from a molten state. This invention is applicable to every inorganic material having such a property, but glass is chosen as a typical example of the fiberizable inorganic materials throughout the description given hereinafter with consideration of industrially great importance of glass fibres and for the sake of convenience.

A brief description of conventional methods for the manufacture of discontinuous or relatively short glass fibres will firstly be given with reference to part of the accompanying drawings, wherein:

FIGS. 5–7 are views similar to FIG. 4 but show three different modifications of the apparatus of FIG. 3;

FIG. 8 is a perspective view of an optional element of the apparatus according to the invention;

FIGS. 9 and 10 are perspective views of a nozzle assembly in the apparatus of FIG. 6, showing an optional modification in two different forms;

Figure 1:
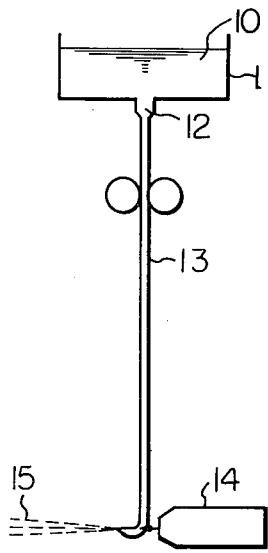
FIGS. 1 and 2 are schematic illustrations of conventional apparatus for the manufacture of glass fibres, respectively showing a flame-blowing method and a centrifugation method.

In a conventional flame-blowing method illustrated in FIG. 1, a molten glass composition 10 is kept in a vessel 11 which has a discharge port 12 at the bottom. A vertically falling stream of the molten glass 10 is once cooled so as to turn into a downwardly extending glass rod 13. A burner 14 blows a high temperature flame laterally at the glass rod 13 to melt the glass and break it into short filaments 15.

Figure 2:
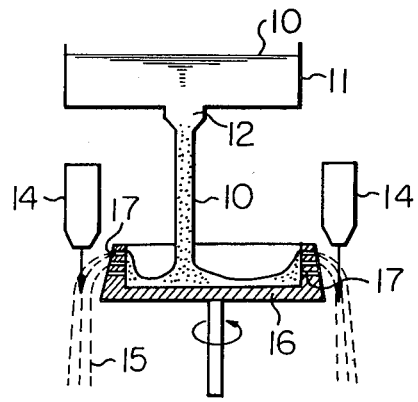

In a centrifugation method illustrated in FIG. 2 as another example of conventional methods, the vessel 11 for molten glass 10 is arranged such that the molten glass 10 falls from the discharge port 12 on a cup-shaped rotor 16. This rotor 16 has a multiplicity of orifices 17 in its side wall and rotates about a vertical shaft at a high circumferential velocity, so that the molten glass 10 is discharged from the rotor 16 by centrifugal force through the orifices 17. A plurality of burners 14 which are arranged to surround the rotor 16 blow a high temperature flame at the laterally discharged molten glass 10 to break it into fibres 15.

A primary disadvantage of these conventional methods for the manufacture of glass fibres is the consumption of very large amounts of heat energy. Particularly the flame-blowing method consumes a huge amount of heat energy since the heat energy needed for melting the solidified glass rod 13 by the burner 14 amounts to about tenfold on the basis of the heat energy consumed at the preparation of the molten glass 10. The centrifugation method too consumes a considerably large amount of heat energy because of the use of the burners 14 and, besides, involves a considerably great operating cost due to the need of continuously rotating the rotor 16 at a high speed such as 3000 rpm or greater. As an additional disadvantage common to the flame-blowing and centrifugation methods, the operation produces a loud noise since the burners 14 need to be provided with blowers of large capacity to ensure that the flame has sufficiently high temperature and high velocity for melting and breaking the glass.

It is an object of the present invention to remedy the above described disadvantages inherent to the described conventional methods for the manufacture of fibres of inorganic materials.

It is another object of the invention to provide a novel method for the manufacture of discontinuous fibres of inorganic materials suited to fiberization from a molten state as typified by glass compositions, which method allows a great saving of heat energy compared with conventional manufacturing methods and, besides, features the possibility of being performed without producing loud noise.

It is a still another object of the invention to provide a novel apparatus for the manufacture of discontinuous fibres of the described type of inorganic materials, which apparatus allows a manufacturing method according to the invention to efficiently be put into industrial practice.

It is a further object of the invention to provide apparatus for the described use, in which apparatus principal elements for the fiberization are readily adjustable so as to be suited for the temperature-viscosity characteristic of the material.

According to the invention, an inorganic material of the described property is fiberized by a method comprising the steps of allowing a melt of the inorganic material to vertically fall by gravitation as a hollow cylindrical stream, continuously injecting a pressurized gas into the hollow of the cylindrical stream downwards, and continuously blowing a pressurized gas at the stream of the melt from the outside in a downwardly and inwardly inclined direction.

The injection of the pressurized gas into the hollow of the cylindrical stream of the melt may be accomplished either substantially vertically downwards or, at least partly, in downwardly and outwardly inclined directions.

A fiberizing apparatus according to the invention comprises a vessel which can contain therein a melt of an inorganic material and has a discharge port at the bottom with an orifice of a circular plan view geometry; a centre nozzle to downwardly eject a pressurized gas, which nozzle is disposed in the vessel and has a vertically extending hollow cylindrical portion in a coaxial arrangement with the discharge port of the vessel such that an annular space is defined in the discharge port around the cylindrical portion of the nozzle; and a ring nozzle which is located below the vessel to surround an imaginary and axial extension of the discharge port and has at least one ejection orifice arranged on a horizontal circumference so as to eject a pressurized gas in a downwardly and inwardly inclined direction.

The discharge port preferably takes the form of a hollow cylinder which extends vertically downwards from the bottom of the vessel, and the ejection orifice of the centre nozzle is positioned either in the cylindrical discharge port or below the lower end of the discharge port.

The cylindrical portion of the centre nozzle may be a lowermost portion, meaning that the gas is ejected from the lower end of this portion. Alternatively, the cylindrical portion may be an intermediate portion which is contiguous to a downwardly flaring lowermost portion. In this case the gas is ejected from the lower end of the flaring portion, the lower end of which portion is positioned below the lower end of the cylindrical discharge port of the vessel and has a larger area than the cross-sectional area of the discharge port.

When a lowermost portion of the centre nozzle is flaring, the apparatus may optionally include a generally conical gas flow deflector which is arranged, with its apex upwards, coaxially with the centre nozzle and is positioned so as to intrude into the flared portion of the centre nozzle.

The ring nozzle has either a plurality of orifices with circumferential intervals therebetween or a single orifice which takes the form of a circumferential slot.

It is a principal feature of the invention that the fiberization can be accomplished without using any burner or, in other words, without consuming heat energy (heat energy needed for the preparation of the melt is left out of consideration). Besides, the fiberizing apparatus includes fundamentally no moving mechanism. Accordingly the manufacture of the fibres by the technique of the invention can be accomplished with remarkably reduced operating costs, with an additional advantage of producing less noise, compared with the manufacture by conventional techniques.

The invention will fully be understood from the following description of preferred embodiments with reference to FIGS. 3–15 of the accompanying drawings.

Figure 3:
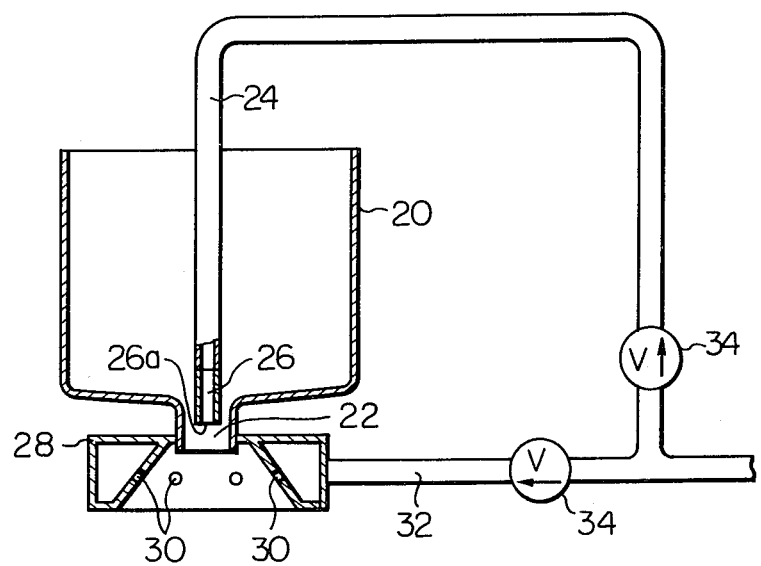
FIG. 3 is an elevational view, partly in section, of an essential part of a fibre manufacturing apparatus according to the invention.

FIG. 3 shows a fundamental construction of a fiberizing apparatus according to the invention. This apparatus has a generally cup-shaped and stationarily placed vessel 20 which can contain therein a molten inorganic material, a molten glass composition for example, but has a discharge port 22 at the bottom. The discharge port 22 has a circular plan view geometry at its end or orifice and preferably takes the form of a downwardly protruding cylinder as illustrated. A gas supply pipe 24 is introduced into the vessel 20 to downwardly extend from the upper mouth toward the discharge port 22, and a gas injection nozzle 26 is attached to the end of the pipe 24 such that the lower end or orifice 26a of the nozzle 26 takes a position in the discharge port 22. This nozzle 26 (which will hereinafter be referred to as centre nozzle for convenience) is smaller than the discharge port 22 in cross section so as not to prevent the outflow of the molten glass 10 through the port 22 and is arranged substantially coaxially with the cylindrical port 22 so as to eject a gas vertically downwards. A ring nozzle 28 having a plurality of orifices 30 is positioned a little below the lower end of the discharge port 22, and a gas supply pipe 32 which extends outside the vessel 20 is connected to this nozzle 28. The orifices 30 are circumferentially arranged on a horizontal plane lying somewhat below the port 22 so as to surround an imaginary and axial extension of the cylindrical discharge port 22 radially with a distance therebetween and can eject a gas downwards and inwards (towards the axis of the cylindrical port 22). The apparatus is supplemented by a pressurized gas reservoir (omitted from the illustration) to which are connected the pipes 24 and 32 via flow control valves 34.

Figure 4:
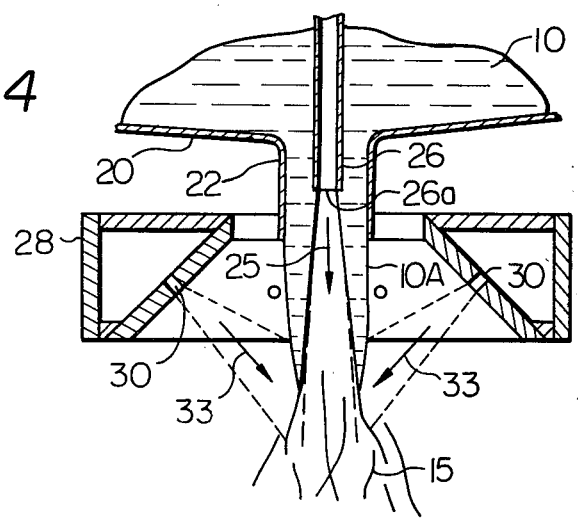
FIG. 4 is a fragmentarily enlarged elevational and sectional view of the same apparatus.

As shown in FIG. 4, molten glass 10 in the vessel 20 gradually passes through an annular space defined in the cylindrical port 22 around the centre nozzle 26 and flows out of the port 22 by gravitation to vertically fall as a hollow cylindrical stream 10A. The centre nozzle 26 continuously injects the pressurized gas vertically downwards into the central hollow in the cylindrical glass stream 10A, so that the cylindrical stream 10A tends to flare downwards. In this instance, however, the ring nozzle 28 too continues the discharge of the pressurized gas from the outside of the cylindrical glass stream 10A. Due to the circumferential arrangement and inclined orientation of the orifices 30, the gas ejected from the ring nozzle 28 blows at the glass stream 10A against the aforementioned flaring movement. To summarize, gas streams 25 and 33 from the centre nozzle 26 and the ring nozzle 28 jointly act on the hollow cylindrical stream 10A of the molten glass so as to press, extend, smash and blow away the streaming molten glass 10A. As a result, the molten glass 10A is finely broken into relatively short fibres 15.

It is possible to fiberize the melt 10 without the provision of the centre nozzle 26 (merely by the gas ejection from the orifices 30 of the ring nozzle 28), but a joint use of the centre nozzle and the ring nozzle 28 is markedly advantageous in that the fiberization can be accomplished quite readily and efficiently.

As a modification of the illustrated ring nozzle 28, the plurality of orifices 30 may be replaced by a single orifice which is in the form of a circumferential slot.

Figure 5:
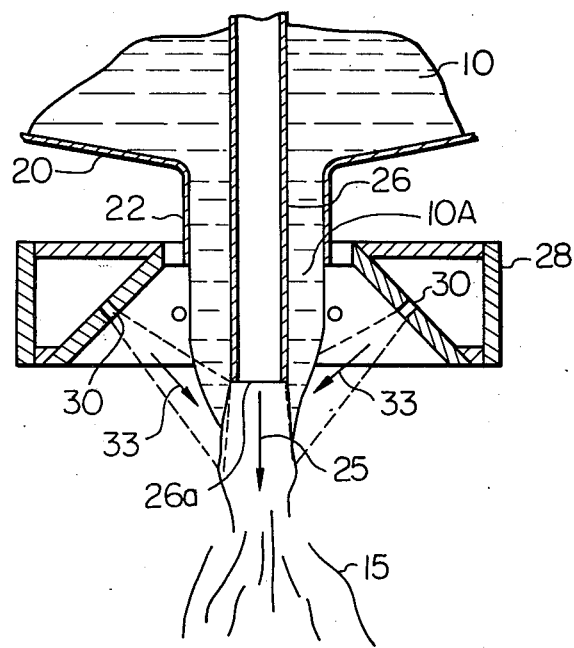

Referring to FIG. 5, the centre nozzle 26 may be extended than in the case of FIG. 4 such that its orifice 26a is positioned outside and downwardly of the discharge port 22. In this case it is preferably that a lower end portion of the centre nozzle 26 is flared downwards as indicated at 26b in FIG. 6 to have the shape of an umbrella or hollow cone with the orifice 26a as the base. As a result, the orifice 26a of the centre nozzle 26 has an enlarged area which may be comparable to, or even larger than, the cross-sectional area of the discharge port 22. When the centre nozzle 26 is extended out of the discharge port 22 and flares as in FIG. 6, the hollow cylindrical stream 10A of the molten glass is established almost only within the cylindrical discharge port 22. When discharged from the port 22, the molten glass flows along the outside of the flaring portion 26b of the centre nozzle 26 as a relatively thin layer 10B and commences a free fall upon arrival at the lower end of the flared nozzle 26. This manner of the downward flow of the molten glass is favorable to the fiberization by the gas blowing. The fiberization is further facilitated by a certain extent of cooling of the molten glass accomplished during the flow as the thin layer 10B on the outside of the flared nozzle 26. The advantage of the flaring of the centre nozzle 26 can further be augmented by the provision of a deflector 36 which also has the shape of an umbrella or cone and is placed below and coaxially with the centre nozzle 26 such that an apex portion of the deflector 36 intrudes into the flaring portion 26b of the nozzle 26. The gas flowing in the centre nozzle 26 collides against this deflector 36 before the arrival at the nozzle orifice 26a, so that the gas is deflected and ejected downwards and outwards from a peripheral region of the nozzle orifice 26a.

The flaring portion 26b of the centre nozzle 26 may uniformly be tapered over the entire length of this portion 26b as shown in FIG. 6 or, alternatively, may particularly greatly be flared in a tip region (near the orifice 26a) as shown in FIG. 7. Independently of the manner of flaring, the flaring portion 26b may intrude into an upper region of the cylindrical discharge port 22 as shown in FIG. 7. In any case, the distahce L between the lower end of the discharge port 22 and the nozzle orifice 26a, the semi-apex angle $\alpha$ of the conically flaring portion 26b and the semi-apex angle $\beta$ of the conical deflector 36 are determined based on the temperature-viscosity characteristic of the molten material 10.

It is desired that the melt 10 be discharged through the annular space defined in the port 22 around the centre nozzle 26 freely, continuously, smoothly and uniformly. This desire, however, will not fully be satisfied if there is nonuniformity in the temperature or viscosity of the melt 10 in the vessel 20, or the centre nozzle 26 is somewhat offset with respect to the axis of the discharge port 22. As a compensation for such irregularities, it is preferable that a disc 38 having a plurality of apertures 40 as shown in FIG. 8 is disposed in the vessel 20 mounted on the downwardly extending gas supply pipe 24 so as to horizontally lie at a location slightly above the upper end of the cylindrical discharge port 22. The provision of the perforated plate 38 is of aid for a uniform inflow of the melt 10 into the port 22. When the centre nozzle 26 has the flaring portion 26b, preferably a plurality of grooves 42 of a rounded profile as shown in FIG. 9 are radially formed on the outside of the flaring portion 26b as an aid for a uniform distribution of the melt flowing along the nozzle 26. These grooves 42 may be extended upwards as shown in FIG. 10 so that the straight portion of the centre nozzle 26 and a lower portion of the gas supply pipe 24 have vertical and parallel grooves 44 on the outside. As an additional effect of the grooves 42, 44, the contact of the melt 10 with the grooved nozzle 26 and the pipe 24 results in an enhanced cooling of the melt (the grooving means an increase in the surface area effective for heat conduction). This also is favorable for the fiberization of the molten inorganic material.

Figure 11:
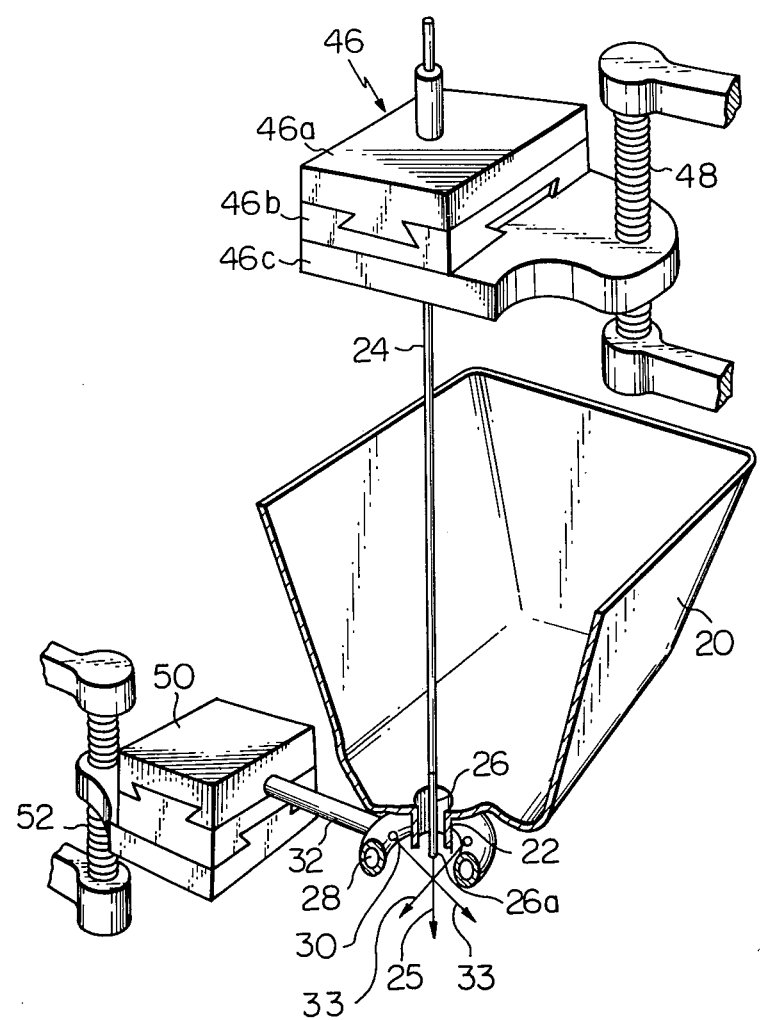
FIG. 11 is a fragmentary, perspective and partly cutaway view of apparatus according to the invention, showing a nozzle position adjustment mechanism in the apparatus.

Principally, the apparatus according to the invention employs a coaxial arrangement of the centre nozzle 26 and the discharge port 22 (which has a circular orifice), but there is a chance that certain offset of the centre nozzle 26 occurs due to thermal expansion caused by a high temperature of the melt 10. A deviation of the centre nozzle 26 from the axis of the port tends to cause an increase in the scattering of the filament diameter of the produced fibres, meaning a lowering in the quality of the fibres. The apparatus, therefore, preferably has an adjustment means for minutely altering the position of the centre nozzle 26 at least laterally but preferably also vertically. FIG. 11 shows, by way of example, a nozzle position adjustment mechanism. In this example, the gas supply pipe 24 (to which the centre nozzle 26 is attached) is vertically supported by a mount 46 which is an assembly of three plates 46a, 46b and 46c, individually slotted and/or ridged with a pintail profile and, in the assembled state, horizontally slidable in four directions at right angle with each other. A screw 48 supports the mount 46 so that the mount 46 can be moved upwards and downwards. In this case the gas supply pipe 24 takes the form of a flexible duct at a section upstream of the mount 46. In the same sense, the ring nozzle 28 is preferably made movable both horizontally and vertically. In FIG. 11, a mount 50 which is principally similar to the above described mount 46 supports an horizontally extending part of the gas supply pipe 32 (to which the ring nozzle 28 is attached) and is supported by a screw 52 for vertical movements.

Figure 12:
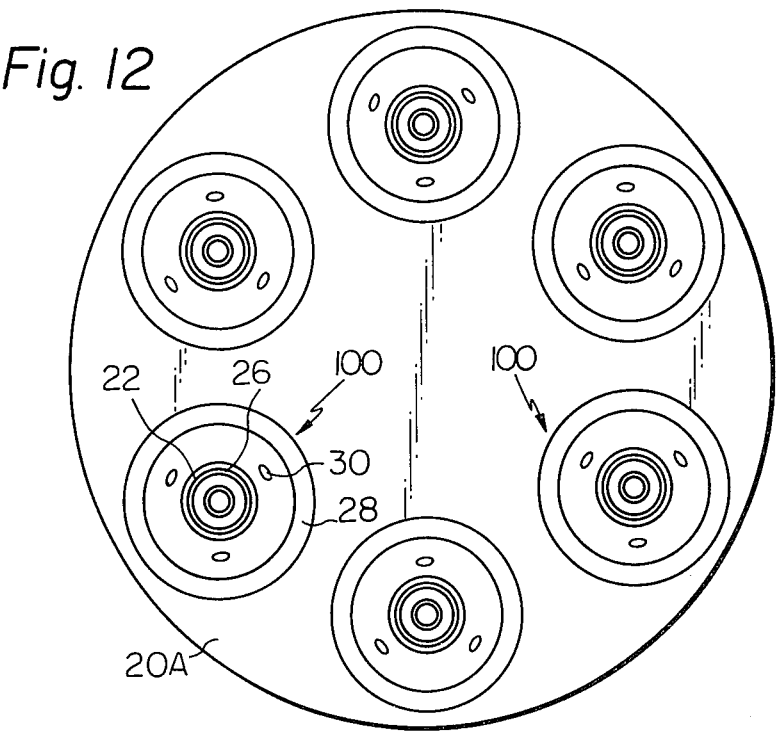
FIGS. 12 and 13 are bottom plan views of apparatus according to the invention, showing the installation of a plurality of fiberizing units in the individual apparatus in two different arrangements.
Figure 13:
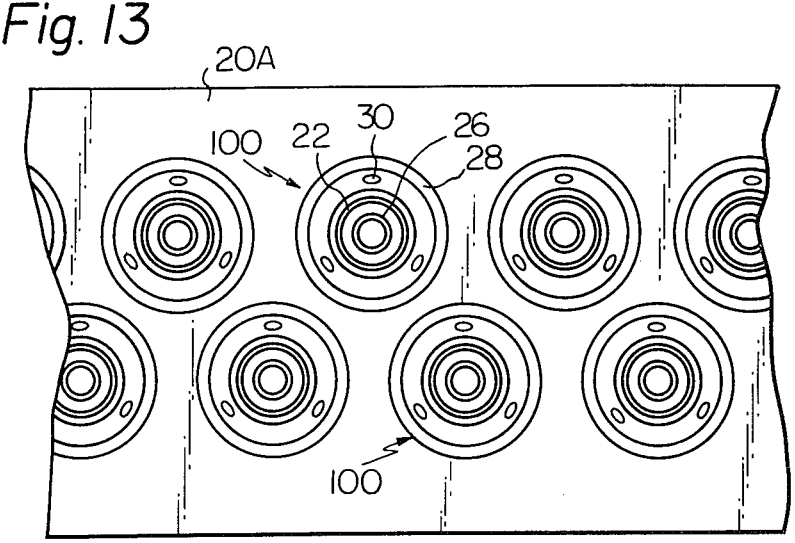

A fiberizing apparatus according to the invention can be constructed to have two or more discharge ports 22 in a single vessel with the provision of a combination of the centre nozzle 26 and the ring nozzle 28 for each port 22. FIG. 12 shows a circumferential arrangement of six port-nozzle assemblies 100 in a single vessel 20A. Alternatively, the port-nozzle assemblies 100 may be arranged linearly as shown in FIG. 13.

It is convenient to use air as the gas to be ejected from the nozzles 26 and 28, but other gases may be used if desired. The fiberizing apparatus needs to be supplemented with a suitable apparatus for pressurizing the gas and supplying the pressurized gas to the nozzles 26 and 28 through the pipes 30, 32, and if necessary, a heating apparatus such as a heat exchanger for heating the pressurized gas before the arrival at the nozzles 26 and 28.

Figure 14:
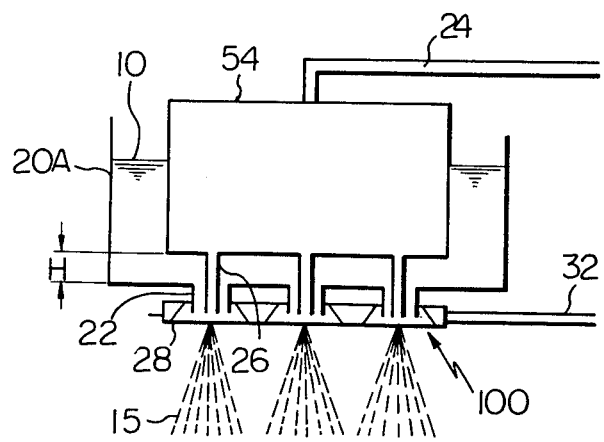
FIG. 14 is a diagrammatic presentation of apparatus according to the invention in elevation and shows the provision of a reservoir tank in a gas feed circuit of the apparatus.

It is desirable that the pressurized gas be supplied to the nozzles 26 and 28 without exhibiting pulsation for obtaining the fibres 15 with uniformity in quality. The provision of an intermediate gas reservoir (or reservoirs) in the gas supply circuit is effective for the avoidance of pulsation of the gas flow at the nozzles 26 and 28. Since the influence of the pulsation is more significant at the centre nozzle 26 than at the ring nozzle 28, it is convenient to provide a single gas reservoir 54, shown in FIG. 14, at an intermediate section of the gas supply pipe 24 near the centre nozzle(s) 26. This reservoir 54 may be disposed in the vessel 20A (or 20). In this case, the reservoir 54 may be shaped generally symmetrical to the vessel 20A as seen in FIG. 14 because then the volume rate of discharge of the melt 10 through the ports 22 can be varied by varying the vertical distance H between the bottom of the reservoir 54 and the bottom of the vessel 20A.

Figure 15:
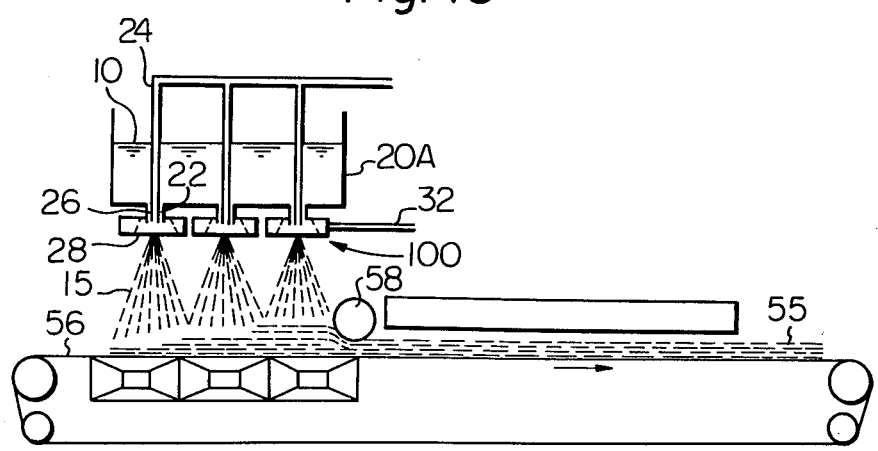
FIG. 15 is a diagrammatic presentation, in elevation, of a combination of apparatus according to the invention and a felt-producing apparatus.

Referring to FIG. 15, the fibres 15 manufactured by the technique of the invention may immediately be processed into a nonwoven mat or felt 55. In the illustrated case, the fibres 15 fall on a belt conveyor 56 and transferred to pressure rolls indicated at 58 for the production of felt 55.

What is claimed is:

1. A method of manufacturing fibres of an inorganic material which is fiberizable from a molten state, the method comprising the steps of:
  providing a vertically-extending straight and cross-sectionally circular first tube;
  inserting a cross-sectionally circular second tube concentrically into said first tube such that a cross-sectionally annular space is defined in at least an uppermost portion of said first tube around said second tube;
  allowing a melt of the inorganic material to fill up said annular space and vertically fall therethrough by gravitation thereby establishing a cross-sectionally annular stream within said annular space, said cross-sectionally annular stream forming a hollow cylindrical stream upon leaving said annular space;

continuously injecting generally downwards through said second tube a pressurized gas into said hollow cylindrical stream; and continuously blowing a pressurized gas at said hollow cylindrical stream from the outside in a downwardly and inwardly inclined direction.

2. A method as claimed in claim 1, wherein the inorganic material is a glass composition.

3. A method as claimed in claim 1, wherein the pressurized gas injected through said second tube into said hollow of said stream is injected substantially vertically downwards.

4. A method as claimed in claim 1, wherein the pressurized gas injected through said second tube into said hollow of said stream is injected at least partly in downwardly and outwardly inclined directions, said second tube being inserted in said first tube in such manner that a lower end of said second tube protrudes from a lower end of said first tube, the protruding portion of said second tube being downwardly flared.

5. A method as claimed in claim 4, further comprising the step of allowing said hollow cylindrical stream to collide with a generally conical surface, which is substantially coaxial with said hollow cylindrical stream and extends downwards, before blowing the pressurized gas at said hollow cylindrical stream from the outside.

6. Apparatus for the manufacture of fibres of an inorganic material which is fiberizable from a molten state, the apparatus comprising:

a vessel for containing a melt of the inorganic material, having a discharge port at the bottom, said discharge port taking the form of a circular and hollow cylinder which extends vertically downwards from the bottom of said vessel;

a tubular centre nozzle for downwardly ejecting a pressurized gas, said centre nozzle being introduced coaxially into said discharge port from the inside of said vessel and having a vertically extending hollow cylindrical portion located such that a cross-sectionally annular space is defined in at least an uppermost portion of said discharge port around said cylindrical portion of said centre nozzle; and a ring nozzle located below said vessel to surround an imaginary and axial extension of said discharge port and having at least one ejection orifice arranged on a horizontal circumference to inject a pressurized gas in a downwardly and inwardly inclinded direction.

7. Apparatus as claimed in claim 6, further comprising a gas reservoir through which a pressurized gas is supplied to said centre nozzle, said gas reservoir being at least partly disposed in said vessel to be spaced from both the side wall and the bottom of said vessel.

8. Apparatus as claimed in claim 6, wherein said centre nozzle has said hollow cylindrical portion as a lowermost portion such that the pressurized gas is ejected from the lower end of this portion, said lowermost portion of said centre nozzle intruding into an upper portion of said discharge port.

9. Apparatus as claimed in claim 6, wherein said centre nozzle has said hollow cylindrical portion as a lowermost portion such that the pressurized gas is ejected from the lower end of this portion, said lowermost portion of said centre nozzle extending downwardly out of said discharge port.

10. Apparatus as claimed in claim 6, wherein said hollow cylindrical portion of said centre nozzle is an intermediate portion and contiguous to a downwardly flaring lowermost portion such that the lower end of said centre nozzle is positioned below the lower end of said discharge port and has a larger area than the cross-sectional area of said discharge port.

11. Apparatus as claimed in claim 10, further comprising a gas flow deflector which is a generally conical member, with its apex upwards, arranged coaxially with said centre nozzle to intrude into said flaring portion.

12. Apparatus as claimed in claim 10, wherein a plurality of grooves of a rounded profile are radially formed on the outside of said downwardly flaring lowermost portion of said centre nozzle.

13. Apparatus as claimed in claim 12, wherein a plurality of grooves of rounded profile are axially formed on the outside of said cylindrical portion of said centre nozzle to respectively be contiguous to the radial grooves on the flaring portion.

14. Apparatus as claimed in claim 6, wherein said at least one ejection orifice of said ring nozzle is a plurality of orifices with circumferential intervals therebetween.

15. Apparatus as claimed in claim 6, wherein said at least one ejection orifice of said ring nozzle is a single orifice in the form of a circumferential slot.

16. Apparatus for the manufacture of fibres of an inorganic material which is fiberizable from a molten state, the apparatus comprising:

a vessel for containing a melt of the inorganic material, having a discharge port at the bottom, said discharge port having an orifice of a circular plan view geometry;

a centre nozzle for downwardly ejecting a pressurized gas, said centre nozzle being disposed in said vessel in a coaxial arrangement with said discharge port and having a vertically extending hollow cylindrical portion located such that an annular space is defined in at least an uppermost portion of said discharge port around said cylindrical portion of said centre nozzle;

a ring nozzle located below said vessel to surround an imaginary and axial extension of said discharge port and having at least one ejection orifice arranged on a horizontal circumference to inject a pressurized gas in a downwardly and inwardly inclined direction; and means for altering the position of said centre nozzle both horizontally and vertically to such extent as needed for minutely adjusting the disposition of said centre nozzle relative to said discharge port and said ring nozzle.

17. Apparatus as claimed in claim 16, further comprising means for altering the position of said ring nozzle both horizontally and vertically to such extent as needed for minutely adjusting the disposition of said at least one ejection orifice relative to said discharge port and said centre nozzle.

18. Apparatus as claimed in claim 6, further comprising a perforated plate horizontally and stationarily disposed in said vessel to lie above said discharge port.

19. Apparatus as claimed in claim 6, wherein said vessel has a plurality of said discharge ports, each of said plurality of ports being combined with a centre nozzle and a ring nozzle.

* * * * *